United States Patent
Choi et al.

(10) Patent No.: US 11,977,447 B2
(45) Date of Patent: May 7, 2024

(54) STORAGE DEVICE, OPERATING METHOD FOR THE SAME AND MEMORY SYSTEM

(71) Applicant: SAMSUNG ELECTRONICS CO., LTD., Suwon-si (KR)

(72) Inventors: Myung-Sik Choi, Hwaseong-si (KR); Yun-Ho Youm, Osan-si (KR); Jae Sung Yoo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/742,164

(22) Filed: May 11, 2022

(65) Prior Publication Data
US 2023/0146266 A1    May 11, 2023

(30) Foreign Application Priority Data
Nov. 11, 2021 (KR) .................. 10-2021-0154993

(51) Int. Cl.
*G06F 11/07* (2006.01)
*G06F 11/14* (2006.01)

(52) U.S. Cl.
CPC .... *G06F 11/1428* (2013.01); *G06F 2201/805* (2013.01)

(58) Field of Classification Search
CPC ............. G06F 11/1415; G06F 11/1417; G06F 11/1428
USPC ........................................... 714/2, 15; 713/2
See application file for complete search history.

(56) References Cited

U.S. PATENT DOCUMENTS

| | | | |
|---|---|---|---|
| 7,761,735 B2 | 7/2010 | Ellsworth et al. | |
| 7,849,454 B2 | 12/2010 | Lambert et al. | |
| 7,865,775 B2 | 1/2011 | Yao et al. | |
| 9,619,238 B2 | 4/2017 | Potlapally et al. | |
| 9,898,368 B1 | 2/2018 | Hendricks et al. | |
| 10,002,054 B2 | 6/2018 | Yang | |
| 2007/0169088 A1* | 7/2007 | Lambert | G06F 11/0709 717/168 |
| 2008/0256525 A1* | 10/2008 | Ellsworth | G06F 11/1433 717/168 |
| 2010/0115576 A1* | 5/2010 | Hale | H04L 67/56 717/172 |
| 2012/0167205 A1* | 6/2012 | Ghetie | G06F 21/572 726/22 |
| 2018/0096154 A1* | 4/2018 | Shivanna | G06F 21/572 |
| 2019/0236277 A1* | 8/2019 | Chang | G06F 21/64 |
| 2020/0387460 A1* | 12/2020 | Lin | G06F 13/4282 |

(Continued)

FOREIGN PATENT DOCUMENTS

KR    20070083138 A    8/2007

*Primary Examiner* — Chae M Ko
(74) *Attorney, Agent, or Firm* — Fish & Richardson P.C.

(57) ABSTRACT

A storage device with improved security performance is provided. The storage device comprises a first non-volatile memory storing a firmware image, a second non-volatile memory storing an emergency image, and a storage controller controlling the first and second non-volatile memories, wherein the storage controller checks an integrity of the firmware image received from the first non-volatile memory, loads and executes the emergency image from the second non-volatile memory when the integrity check of the firmware image fails, receives a recover image from an external device based on the emergency image, and provides the recover image to the first non-volatile memory.

19 Claims, 16 Drawing Sheets

(56) References Cited

U.S. PATENT DOCUMENTS

2021/0042035 A1    2/2021  Futagi et al.
2021/0240831 A1*   8/2021  Oncale ...................... G06F 8/65

* cited by examiner

STORAGE DEVICE, OPERATING METHOD FOR THE SAME AND MEMORY SYSTEM

CROSS-REFERENCE TO RELATED APPLICATION

This application claims priority from Korean Patent Application No. 10-2021-0154993 filed on Nov. 11, 2021, in the Korean Intellectual Property Office, and all the benefits accruing therefrom under 35 U.S.C. 119, the contents of which in their entirety are herein incorporated by reference.

BACKGROUND

1. Technical Field

The present disclosure relates to a storage device, an operating method for the same, and a memory system.

2. Description of the Related Art

Semiconductor memory devices include volatile memory devices and non-volatile memory devices. While volatile memory devices have fast read and write speeds, stored content may be lost when power is turned off. Conversely, since the non-volatile memory devices maintain stored content even when the power is turned off, the non-volatile memory devices are used to store content that needs to be maintained regardless of whether or not power is supplied.

As an example, volatile memory devices include a static RAM (SRAM), a dynamic RAM (DRAM), a synchronous DRAM (SDRAM), and the like. The non-volatile memory devices maintain stored content even when the power is turned off. For example, the non-volatile memory devices include a read only memory (ROM), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RRAM), a ferroelectric RAM (FRAM), and the like. The flash memory may be classified into a NOR type flash memory and a NAND type flash memory.

A semiconductor memory device may be booted together when an electronic device connected thereto is booted. In such a case, firmware stored in the semiconductor memory device may be executed. However, software and firmware of the semiconductor memory device may be falsified as a result of an external hacking attempt, and an abnormality may occur in the semiconductor memory device. Accordingly, a method for protecting the firmware of the semiconductor memory device is required.

SUMMARY

Aspects of the present disclosure provide a storage device with improved security performance.

Aspects of the present disclosure provide an operating method for the storage device with improved security performance.

Aspects of the present disclosure provide a memory system with improved security performance.

However, aspects of the present disclosure are not restricted to those set forth herein. The above and other aspects of the present disclosure will become more apparent to one of skill in the art to which the present disclosure pertains by referencing the detailed description of the present disclosure given below.

According to an aspect of the present disclosure, there is provided a storage device with improved security performance. The storage device comprises a first non-volatile memory storing a firmware image, a second non-volatile memory storing an emergency image, and a storage controller controlling the first and second non-volatile memories, wherein the storage controller checks an integrity of the firmware image received from the first non-volatile memory, loads and executes the emergency image from the second non-volatile memory when the integrity check of the firmware image fails, receives a recover image from an external device based on the emergency image, and provides the recover image to the first non-volatile memory.

According to an aspect of the present disclosure, there is provided a memory system comprising a non-volatile memory storing a firmware image and an emergency image, a storage controller controlling the non-volatile memory, and a host device connected to the storage controller and storing a recover image, wherein the non-volatile memory in which the emergency image is stored has a write disable state, and the non-volatile memory in which the firmware image is stored has a write enable state, the storage controller loads and executes the emergency image from the non-volatile memory, and provides a recover image request signal to the host device based on the emergency image, the host device provides the recover image to the storage controller in response to the recover image request signal, and the storage controller replaces the firmware image of the non-volatile memory with the recover image.

According to an aspect of the present disclosure, there is provided an operating method for a storage device, the operating method comprising providing a storage device including a storage controller, a first non-volatile memory storing a firmware image, and a second non-volatile memory storing an emergency image, booting the storage controller to load the firmware image from the first non-volatile memory, performing an integrity check on the firmware image, loading and executing the emergency image from the second non-volatile memory when the integrity check of the firmware image fails, providing a recover image request signal to an external device based on the emergency image, receiving a recover image from the external device, writing the recover image to the first non-volatile memory, and rebooting the storage controller to load the recover image from the first non-volatile memory.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE PREFERRED EMBODIMENTS

Hereinafter, exemplary embodiments of the present disclosure will be described with reference to the attached drawings.

Figure 1:
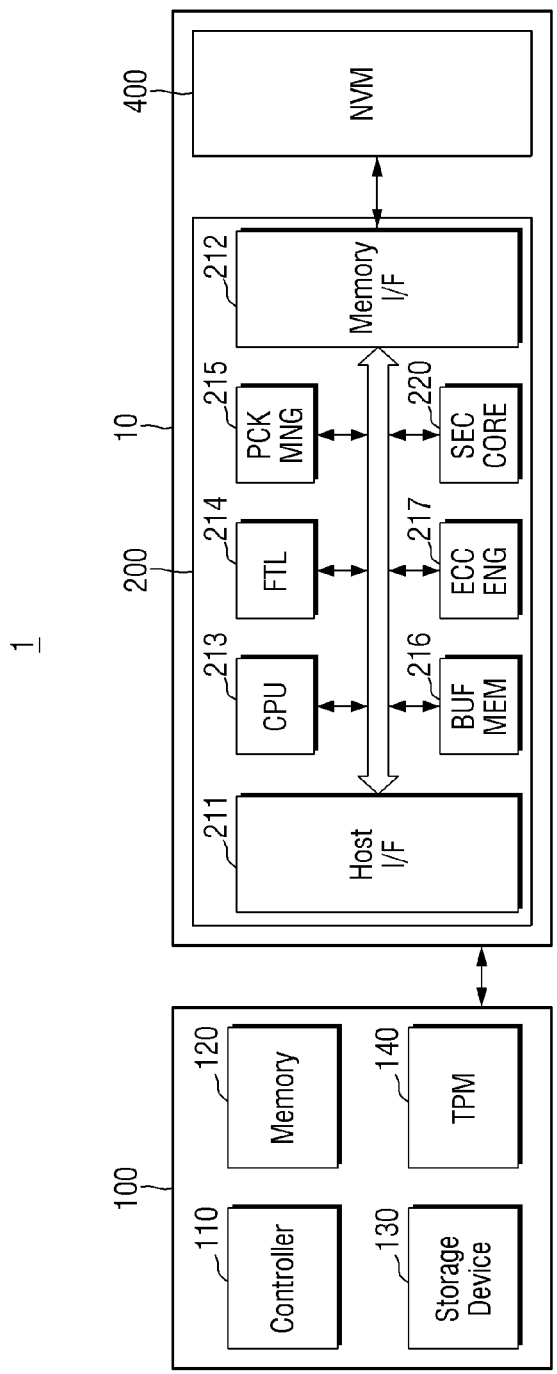
FIG. 1 is a block diagram of a memory system according to some exemplary embodiments.

FIG. 1 is a block diagram of a memory system according to some exemplary embodiments.

Referring to FIG. 1, a memory system 1 may include a host device 100 and a storage device 10. The host device 100 may include a controller 110, a memory 120, a storage device 130, and a security module 140. The controller 110 may control an overall operation of the host device 100. The memory 120 may temporarily store data transmitted from the exterior, data to be transmitted to the storage device 10, or data transmitted from the storage device 10. The storage device 130 may store data used in the host device 100. For example, the storage device 130 may store software, firmware, and the like, and may provide the software, firmware, and the like to the memory 120. The security module 140 may control an overall security operation of the host device 100.

Here, the host device 100 may correspond to a server of a data center. For example, the memory system 1 may correspond to the data center, the host device 100 may correspond to the server, and the storage device 10 may be connected to the host device 100 to exchange data. Accordingly, the storage device 10 may correspond to a DC-oriented storage device. However, an exemplary embodiment of the present disclosure is not limited thereto, and the host device 100 may be an application processor (AP).

The storage device 10 may include a storage controller 200 and a non-volatile memory 400.

The storage device 10 may include storage media for storing data according to a request from the host device 100. As an example, the storage device 10 may include at least one of a solid state drive (SSD), an embedded memory, and a removable external memory. When the storage device 10 is the SSD, the storage device 10 may be a device conforming to a non-volatile memory express (NVMe) standard. When the storage device 10 is the embedded memory or the external memory, the storage device 10 may be a device conforming to a universal flash storage (UFS) or embedded multi-media card (eMMC) standard. Each of the storage devices 10 and the host device 100 may generate and transmit a packet conforming to an adopted standard protocol.

When the non-volatile memory 400 of the storage device 10 includes a flash memory, the flash memory may include a 2D NAND memory array or a 3D (or vertical) NAND (VNAND) memory array. As another example, the storage device 10 may include various other types of non-volatile memories. For example, the storage device 10 may include a magnetic random access memory (MRAM), a spin-transfer torque MRAM, a conductive bridging RAM (CBRAM), a ferroelectric RAM (FeRAM), a phase RAM (PRAM), a resistive RAM, and various other types of memories.

The storage controller 200 may include a host interface 211, a memory interface 212, and a central processing unit (CPU) 213. In addition, the storage controller 210 may further include a flash translation layer (FTL) 214, a packet manager 215, a buffer memory 216, an error correction code (ECC) engine 217, and a security core 220. The storage controller 200 may further include a working memory to which the flash translation layer (FTL) 214 is loaded, and data write and read operations to the non-volatile memory 400 may be controlled by the CPU 213 executing the flash translation layer 214.

The host interface 211 may transmit and receive a packet to and from the host device 100. The packet transmitted from the host device 100 to the host interface 211 may include a command, data to be written to the non-volatile memory 400, or the like, and the packet transmitted from the host interface 211 to the host device 100 may include a response to the command, data read from the non-volatile memory 400, or the like. The host interface 211 may be implemented to comply with standard protocols such as I2C, PCIe, UART, and USB. The memory interface 212 may transmit data to be written to the non-volatile memory 400 to the non-volatile memory 400 or may receive data read from the non-volatile memory 400. The memory interface 212 may be implemented to comply with a standard protocol such as toggle or open NAND flash interface (ONFI).

The flash translation layer 214 may perform several functions such as address mapping, wear-leveling, and garbage collection. An address mapping operation is an operation of converting a logical address received from the host device 100 into a physical address used to actually store data in the non-volatile memory 400. For example, the storage controller 200 may generate a matching table including a logical block address and a corresponding physical block address. Wear-leveling is a technology for preventing excessive deterioration of a specific block by allowing blocks in the non-volatile memory 400 to be uniformly used, and may be implemented through, for example, a firmware technology of balancing erase counts of physical blocks. Garbage collection is a technology for securing a usable capacity in the non-volatile memory 400 in a manner of copying valid data of a block to a new block and then erasing an existing block.

The packet manager 215 may generate a packet according to a protocol of an interface negotiated with the host device 100 or may parse varied information from a packet received from the host device 100.

The buffer memory 216 may temporarily store data to be written to the non-volatile memory 400 or data to be read from the non-volatile memory 400. The buffer memory 216 may be provided in the storage controller 200, but may also be disposed outside the storage controller 200. The buffer memory 216 may cause the CPU 213 to execute firmware or software by temporarily storing the firmware or software.

The ECC engine 217 may perform an error detection and correction function for the data read from the non-volatile memory 400. Specifically, the ECC engine 217 may generate parity bits for the data to be written to the non-volatile memory 400, and the parity bits generated as described above may be stored in the non-volatile memory 400 together with the write data. At the time of reading data from the non-volatile memory 400, the ECC engine 217 may correct an error of read data using the parity bits read from the non-volatile memory 400 together with the read data, and output the read data of which the error is corrected.

The security core 220 may perform overall security performance of the storage controller 200. For example, the security core 220 may perform security performance when the storage controller 200 is booted. For example, the security core 220 may be implemented as an active component root of trust (AC ROT). The security core 220 may perform an integrity check on the firmware through a method such as digital signature verification, and boot the storage device 10 by executing the firmware when the integrity check is successful. In addition, the security core 220 may execute other programs as well as firmware. A more detailed description thereof will be provided below.

Figure 2:
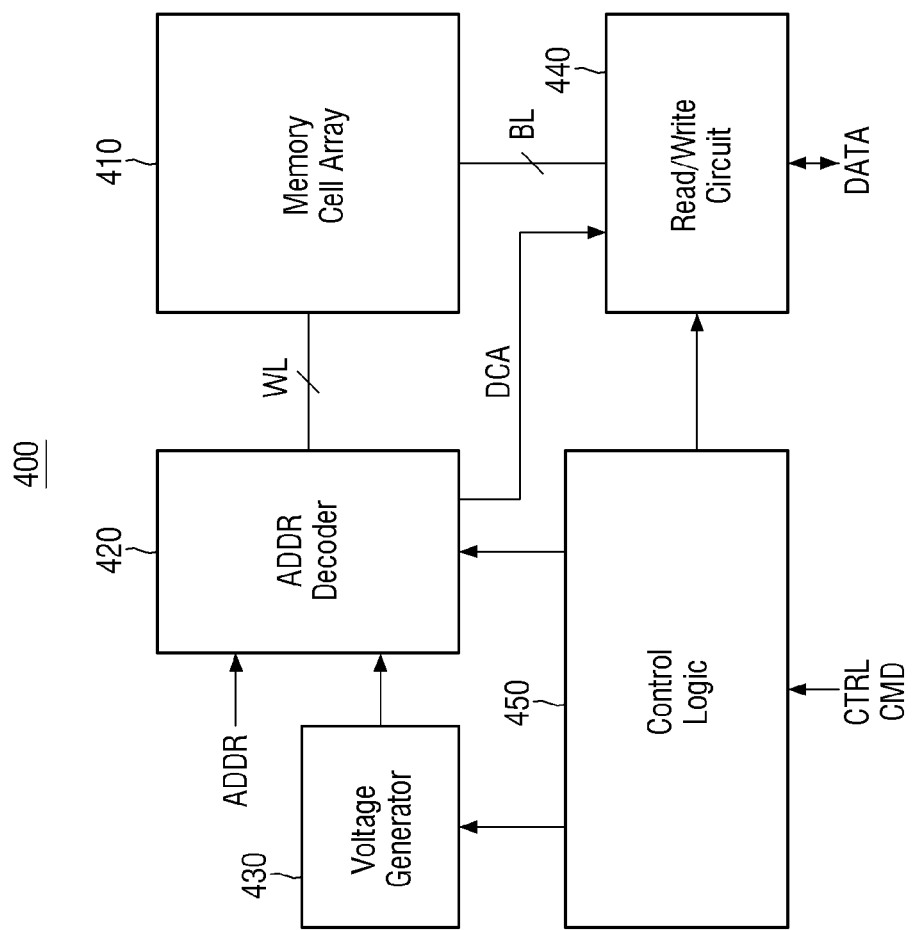
FIG. 2 is a block diagram of the non-volatile memory device of FIG. 1.

FIG. 2 is a block diagram of the non-volatile memory device of FIG. 1.

Referring to FIG. 2, the non-volatile memory 400 may include a memory cell array 410, an address decoder 420, a voltage generator 430, a read/write circuit 440, a control logic circuit 450 (control logic), and the like. Here, except for the memory cell array 410, the address decoder 420, the voltage generator 430, the read/write circuit 440, and the control logic circuit 450 may correspond to peripheral circuits.

The memory cell array 410 may be connected to the address decoder 420 through word lines WL. The memory cell array 410 may be connected to the read/write circuit 440 through bit lines BL. The memory cell array 410 may include a plurality of memory cells. For example, memory cells arranged in a row direction may be connected to the word line WL. For example, memory cells arranged in a column direction may be connected to the bit line BL.

The address decoder 420 may be connected to the memory cell array 410 through the word line WL. The address decoder 420 may operate in response to the control of the control logic circuit 450. The address decoder 420 may receive an address ADDR from the storage controller 200. The address decoder 420 may receive a voltage required for operations such as programming and reading from the voltage generator 430.

The address decoder 420 may decode a row address from the received addresses ADDR. The address decoder 420 may select the word line WL using the decoded row address. Decoded column address DCA may be provided to the read/write circuit 440. For example, the address decoder 420 may include a row decoder, a column decoder, an address buffer, and the like.

The voltage generator 430 may generate a voltage required for an access operation under the control of the control logic circuit 450. For example, the voltage generator 430 may generate a program voltage and a program verification voltage necessary to perform a program operation. For example, the voltage generator 430 may generate read voltages necessary to perform a read operation, and generate an erase voltage and an erase verification voltage necessary to perform an erase operation. For example, the voltage generator 430 may generate a monitoring voltage for monitoring data stored in the memory cell array 410. In addition, the voltage generator 430 may provide the voltage required to perform each operation to the address decoder 420. In some exemplary embodiments, the voltage generator 430 may provide a voltage for programming a threshold voltage of the memory cell array 410 to the address decoder 420.

The read/write circuit 440 may be connected to the memory cell array 410 through the bit line BL. The read/write circuit 440 may exchange data DATA with the storage controller 200. The read/write circuit 440 may operate in response to the control of the control logic circuit 450. The read/write circuit 440 may receive the decoded column address DCA from the address decoder 420. The read/write circuit 440 may select the bit line BL using the decoded column address DCA.

For example, the read/write circuit 440 may program the received data DATA in the memory cell array 410. The read/write circuit 440 may read data from the memory cell array 410 and provide the read data to the exterior (e.g., the storage controller 200). For example, the read/write circuit 440 may include components such as a sense amplifier, a write driver, a column selection circuit, and a page buffer. That is, the read/write circuit 440 may buffer the data DATA received from the storage controller 200 in the page buffer, and program the buffered data DATA in the memory cell array 410.

The control logic circuit 450 may be connected to the address decoder 420, the voltage generator 430, and the read/write circuit 440. The control logic circuit 450 may control the operation of the non-volatile memory 400. The control logic circuit 450 may operate in response to a control signal CRTL and a command CMD (e.g., a write command and a read command) provided from the storage controller 200.

Figure 3:
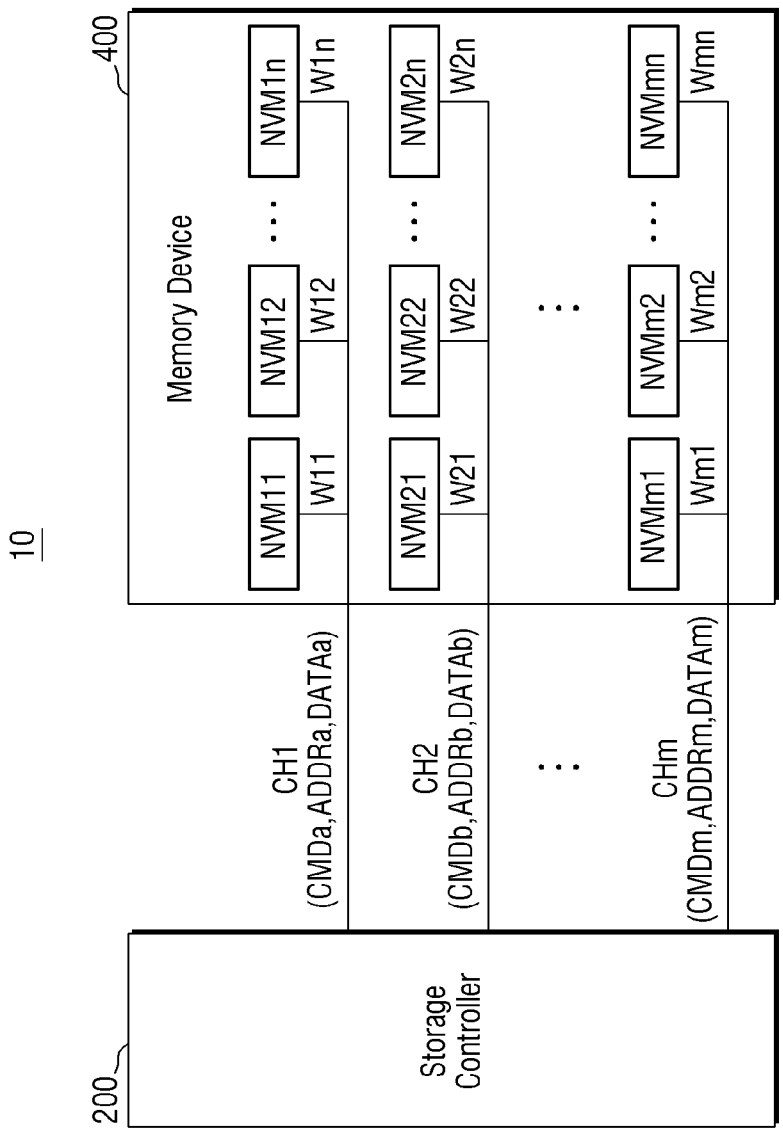
FIG. 3 is a block diagram of the storage controller and the non-volatile memory of FIG. 1.

FIG. 3 is a block diagram of the storage controller and the non-volatile memory of FIG. 1.

Referring to FIG. 3, the storage device 10 may include a storage controller 200 and a non-volatile memory 400. The storage device 10 may support a plurality of channels CH1 to CHm, and the storage controller 200 and the non-volatile memory 400 may be connected to each other through the plurality of channels CH1 to CHm. For example, the storage device 10 may be implemented as a solid state drive (SSD). However, the exemplary embodiments of the present disclosure are not limited thereto, and the storage device 10 may also be implemented as an electrically erasable programmable read-only memory (EEPROM).

The non-volatile memory 400 may include a plurality of non-volatile memory devices NVM11 to NVMmn Each of the non-volatile memory devices NVM11 to NVMmn may be connected to one of the plurality of channels CH1 to CHm through a corresponding way. For example, the non-volatile memory devices NVM11 to NVM1$n$ may be connected to a first channel CH1 through ways W11 to W1$n$, and the non-volatile memory devices NVM21 to NVM2$n$ may be connected to a second channel CH2 through ways W21 to W2$n$. In an exemplary embodiment, each of the non-volatile memory devices NVM11 to NVMmn may be implemented as an arbitrary memory unit capable of operating according to an individual command from the storage controller 200. For example, each of the non-volatile memory devices NVM11 to NVMmn may be implemented as a chip or die, but the present disclosure is not limited thereto.

The storage controller 200 may transmit and receive signals to and from the non-volatile memory 400 through the plurality of channels CH1 to CHm. For example, the storage controller 200 may transmit commands CMDa to CMDm, addresses ADDRa to ADDRm, and data DATAa to DATAm to the non-volatile memory 400 or receive data DATAa to DATAm from the non-volatile memory 400, through the channels CH1 to CHm.

The storage controller 200 may select one of the non-volatile memory devices connected to a corresponding channel through each channel, and transmit and receive signals to and from the selected non-volatile memory device. For example, the storage controller 200 may select the non-volatile memory device NVM11 of the non-volatile memory devices NVM11 to NVM1n connected to the first channel CH1. The storage controller 200 may transmit the command CMDa, the address ADDRa, and the data DATAa to the selected non-volatile memory device NVM11 or receive the data DATAa from the selected non-volatile memory device NVM11, through the first channel CH1.

The storage controller 200 may transmit and receive signals to and from the non-volatile memory 400 in parallel through different channels. For example, the storage controller 200 may transmit a command CMDb to the non-volatile memory 400 through the second channel CH2 while transmitting the command CMDa to the non-volatile memory 400 through the first channel CH1. For example, the storage controller 200 may receive data DATAb from the non-volatile memory 400 through the second channel CH2 while receiving the data DATAa from the non-volatile memory 400 through the first channel CH1.

The storage controller 200 may control an overall operation of the non-volatile memory 400. The storage controller 200 may control each of the non-volatile memory devices NVM11 to NVMmn connected to the channels CH1 to CHm by transmitting signals through the channels CH1 to CHm. For example, the storage controller 200 may control a selected non-volatile memory device from the non-volatile memory devices NVM11 to NVM1n by transmitting the command CMDa and the address ADDRa through the first channel CHE Each of the non-volatile memory devices NVM11 to NVMmn may operate under the control of the storage controller 200. For example, the non-volatile memory device NVM11 may program the data DATAa according to the command CMDa, the address ADDRa, and the data DATAa provided through the first channel CH1. For example, the non-volatile memory device NVM21 may read the data DATAb according to the command CMDb and the address ADDRb provided through the second channel CH2, and transmit the read data DATAb to the storage controller 200.

It has been illustrated in FIG. 3 that the non-volatile memory 400 communicates with the storage controller 200 through the m channels and the non-volatile memory 400 includes the n non-volatile memory devices corresponding to each channel, but the number of channels and the number of non-volatile memory devices connected to one channel may be variously modified.

Figure 4:
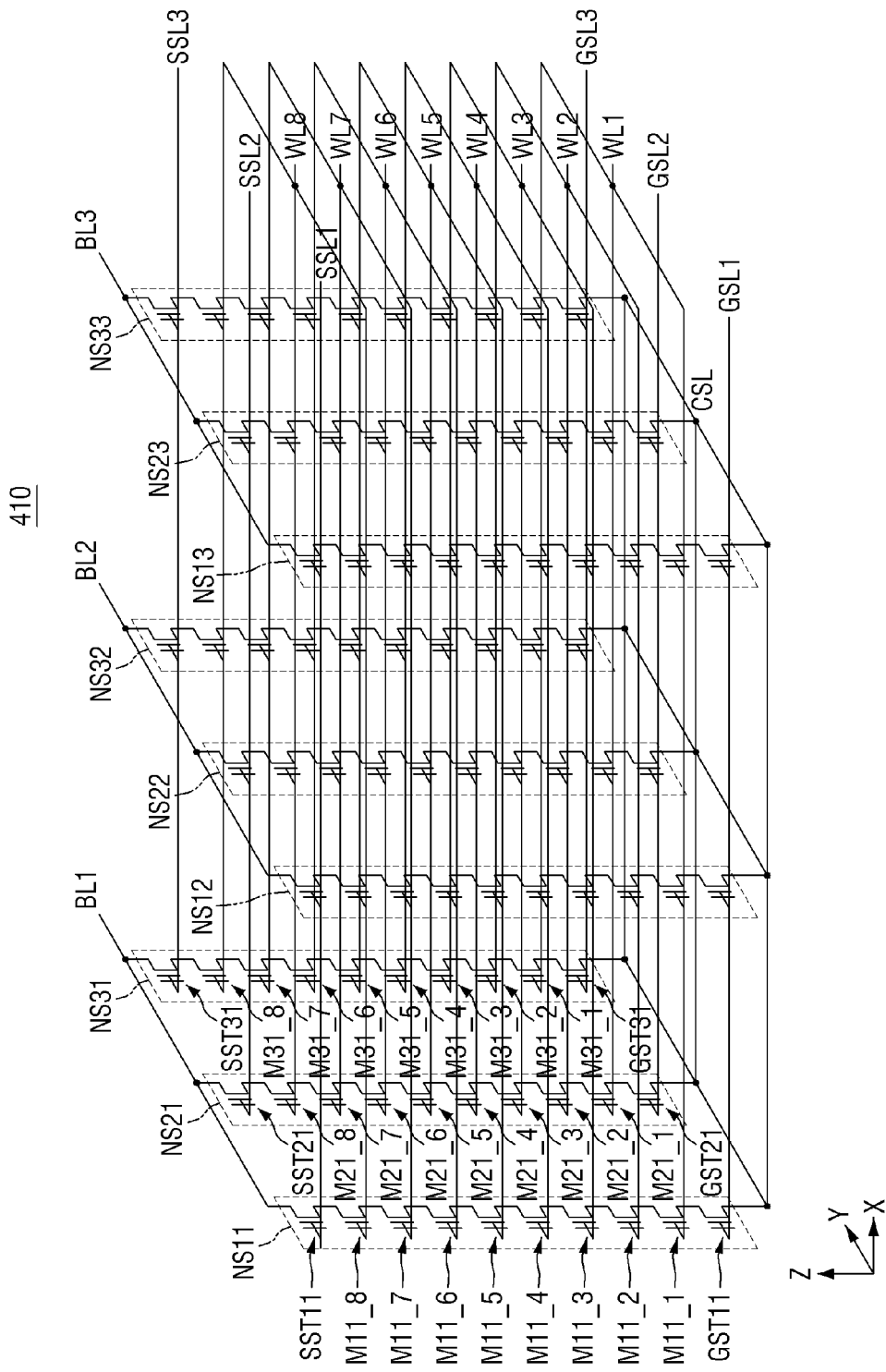
FIG. 4 is an exemplary circuit diagram illustrating a memory cell array according to some exemplary embodiments.

FIG. 4 is an exemplary circuit diagram illustrating a memory cell array according to some exemplary embodiments.

Referring to FIG. 4, the memory cell array 410 may include a plurality of memory cell arrays. For example, the memory cell array 410 may include a plurality of cell strings NS11, NS21, NS31, NS12, NS22, NS32, NS13, NS23, and NS33. The plurality of cell strings NS11, NS21, NS31, NS12, NS22, NS32, NS13, NS23, and NS33 may be disposed on a substrate (not illustrated) in a first direction X and a second direction Y. The plurality of cell strings NS11, NS21, NS31, NS12, NS22, NS32, NS13, NS23, and NS33 may extend in a third direction Z. The plurality of cell strings NS11, NS21, NS31, NS12, NS22, NS32, NS13, NS23, and NS33 may be all connected to a common source line (CSL) formed on a substrate (not illustrated) or within the substrate (not illustrated). Although the common source line CSL is illustrated as being connected to the lowermost end of the plurality of cell strings NS11, NS21, NS31, NS12, NS22, NS32, NS13, NS23, and NS33 in the third direction Z, it is sufficient that the common source line CSL is electrically connected to the lowermost end of the plurality of cell strings NS11, NS21, NS31, NS12, NS22, NS32, NS13, NS23, and NS33 in the third direction Z. The common source line CSL is not limited to being physically positioned at a low end of the plurality of cell strings NS11, NS21, NS31, NS12, NS22, NS32, NS13, NS23, and NS33. In addition, although the plurality of cell strings NS11, NS21, NS31, NS12, NS22, NS32, NS13, NS23, and NS33 are illustrated in this figure as being disposed in a 3×3 array, the arrangement shape and number of the plurality of cell strings disposed in the memory cell array 410 are not limited thereto.

Some cell strings NS11, NS12, and NS13 may be connected to a first ground select line (GSL) GSL1. Some cell strings NS21, NS22, and NS23 may be connected to a second ground select line GSL2. Some cell strings NS31, NS32, and NS33 may be connected to a third ground select line GSL3.

In addition, some cell strings NS11, NS12, and NS13 may be connected to a first string select line (SSL) SSL1. Some cell strings NS21, NS22, and NS23 may be connected to a second string select line SSL2. Some cell strings NS31, NS32, and NS33 may be connected to a third string select line SSL3.

Each of the plurality of cell strings NS11, NS21, NS31, NS12, NS22, NS32, NS13, NS23, and NS33 may include a string select transistor (SST) connected to each of the string select lines. In addition, each of the plurality of cell strings NS11, NS21, NS31, NS12, NS22, NS32, NS13, NS23, and NS33 may include a ground select transistor (GST) connected to each of the ground select lines.

One end of the ground select transistor of each of the plurality of cell strings NS11, NS21, NS31, NS12, NS22, NS32, NS13, NS23, and NS33 may be connected to the common source line CSL. In addition, in each of the plurality of cell strings NS11, NS21, NS31, NS12, NS22, NS32, NS13, NS23, and NS33, a plurality of memory cells may be sequentially stacked in the third direction Z between the ground select transistor and the string select transistor. Although not illustrated in this figure, each of the plurality of cell strings NS11, NS21, NS31, NS12, NS22, NS32, NS13, NS23, and NS33 may include dummy cells between the ground select transistor and the string select transistor. In addition, the number of string select transistors included in each string is not limited to this figure.

For example, the cell string NS11 may include a first ground select transistor GST11 disposed at the lowermost end in the third direction Z, a plurality of first memory cells M11_1 to M11_8 sequentially stacked on the first ground select transistor GST11 in the third direction Z, and a first string select transistor SST11 stacked on the first memory cell M11_8 in the third direction Z. In addition, the cell string NS21 may include a first ground select transistor GST21 disposed at the lowermost end in the third direction Z, a plurality of first memory cells M21_1 to M21_8 sequentially stacked on the first ground select transistor GST21 in the third direction Z, and a first string select transistor SST21 stacked on the first memory cell M21_8 in the third direction Z. In addition, the cell string NS31 may include a first ground select transistor GST31 disposed at the lowermost end in the third direction Z, a plurality of first memory cells M31_1 to M31_8 sequentially stacked on the first ground select transistor GST31 in the third direction Z, and a first string select transistor SST31 stacked on the first memory cell M31_8 in the third direction Z. Hereinafter, the configuration of other strings may be similar thereto.

Memory cells positioned at the same height in the third direction Z from the substrate (not illustrated) or the ground select transistor may be all electrically connected through respective word lines. For example, memory cells having a height in which the first memory cells M11_1, M21_1, and M31_1 are formed may be connected to a first word line WL1. In addition, memory cells having a height in which the first memory cells M11_2, M21_2, and M31_2 are formed may be connected to a second word line WL2. Hereinafter, the arrangement and structure of the memory cells connected to the third word line WL3 to the eighth word line WL8 are similar thereto, and thus a description thereof will be omitted as redundant.

One end of the string select transistor of each of the plurality of cell strings NS11, NS21, NS31, NS12, NS22, NS32, NS13, NS23, and NS33 may be connected to bit lines BL1, BL2, and BL3. For example, the string select transistors SST11, SST21, and SST31 may be connected to a first bit line BL1 extending in the second direction Y. A description of the other string selection transistors connected to the bit lines BL2 and BL3 is also similar thereto, and thus a description thereof will be omitted as redundant.

Memory cells corresponding to one string (or ground) select line and one word line may form one page. A write operation and a read operation may be performed in units of each page. Each memory cell of each page may store two or more bits. Bits written to the memory cells of each page may form logical pages.

The memory cell array 410 may be provided as a three-dimensional memory array. The three-dimensional memory array may be monolithically formed at one or more physical levels of an array of memory cells having an active area disposed over a substrate (not illustrated) and circuitry associated with the operation of memory cells. The circuitry associated with the operation of the memory cells may be positioned in or on the substrate. Being monolithically formed means that the layers of each level of the three-dimensional array can be directly deposited on the layers of the lower level of the three-dimensional array.

A method of storing a firmware image FWI and an emergency image EGI in the first and second non-volatile memories NVM1 and NVM2 will be described with reference to FIGS. 5 to 7.

Figure 5:
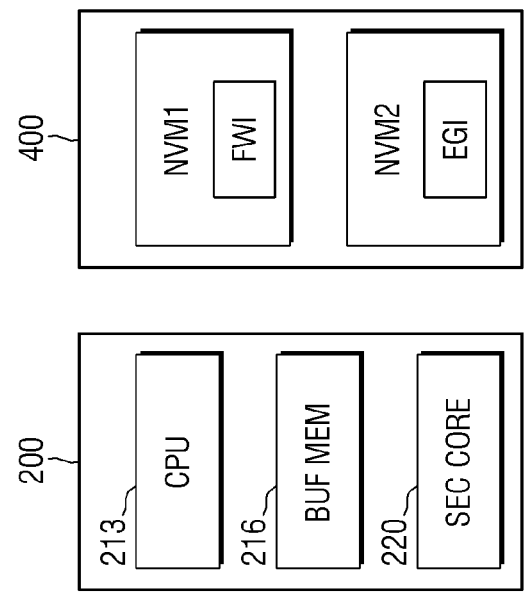
FIG. 5 is a block diagram of a storage device including a plurality of non-volatile memories according to some exemplary embodiments.

FIG. 5 is a block diagram of a storage device including a plurality of non-volatile memories according to some exemplary embodiments. FIG. 6 is a flowchart of a method of storing an emergency image in a second non-volatile memory of FIG. 5. FIG. 7 is a diagram for describing the method of storing the emergency image of FIG. 6.

Referring to FIG. 5, the non-volatile memory 400 may include a first non-volatile memory NVM1 and a second non-volatile memory NVM2. Here, the first and second non-volatile memories NVM1 and NVM2 may correspond to respective portions of the memory cell array 410, and may also include the address decoder 420 and the read/write circuit 440 connected to the memory cell array 410. That is, the first non-volatile memory NVM1 and the second non-volatile memory NVM2 may be separated from each other. Here, the non-volatile memory 400 is described as a flash memory included in the SSD, but exemplary embodiments of the present disclosure are not limited thereto, and the non-volatile memory 400 may also correspond to an EEPROM.

The first non-volatile memory NVM1 may store the firmware image FWI, and the second non-volatile memory NVM2 may store the emergency image EGI. Here, the stored firmware image FWI and emergency image EGI may correspond to data stored before a product corresponding to the storage device 10 is shipped. In addition, the firmware image FWI and the emergency image EGI are stored in the non-volatile memory and are not deleted even when the power is turned off.

The firmware image FWI may correspond to a program used for a basic operation of the storage device 10. For example, the firmware image FWI may be used when the storage device 10 or the storage controller 200 is booted. As the storage controller 200 executes the firmware image FWI, the storage device 10 may operate and data may be stored. Accordingly, an integrity check of the firmware image FWI may be required.

The emergency image EGI may be executed by the storage controller 200 when the integrity verification of the firmware image FWI fails. For example, the storage controller 200 may recover the modified firmware image FWI by executing the emergency image EGI.

Figure 6:
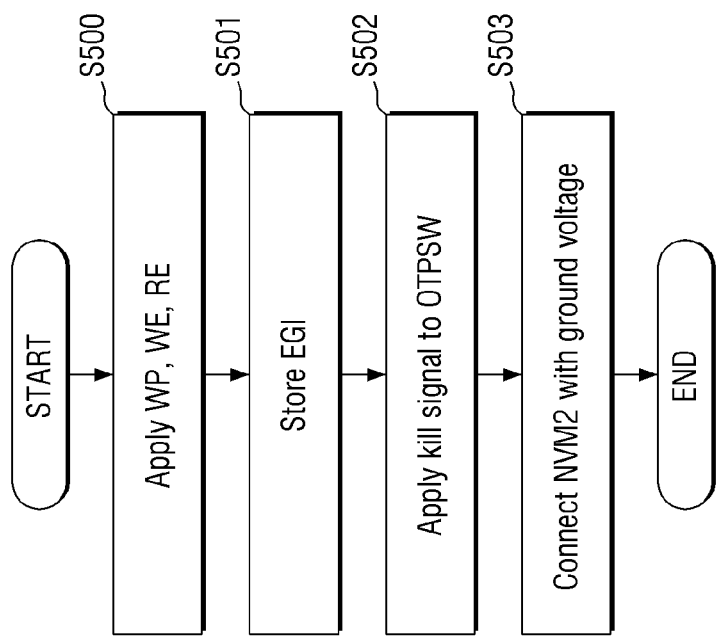
FIG. 6 is a flowchart of a method of storing an emergency image in a second non-volatile memory of FIG. 5.
Figure 7:
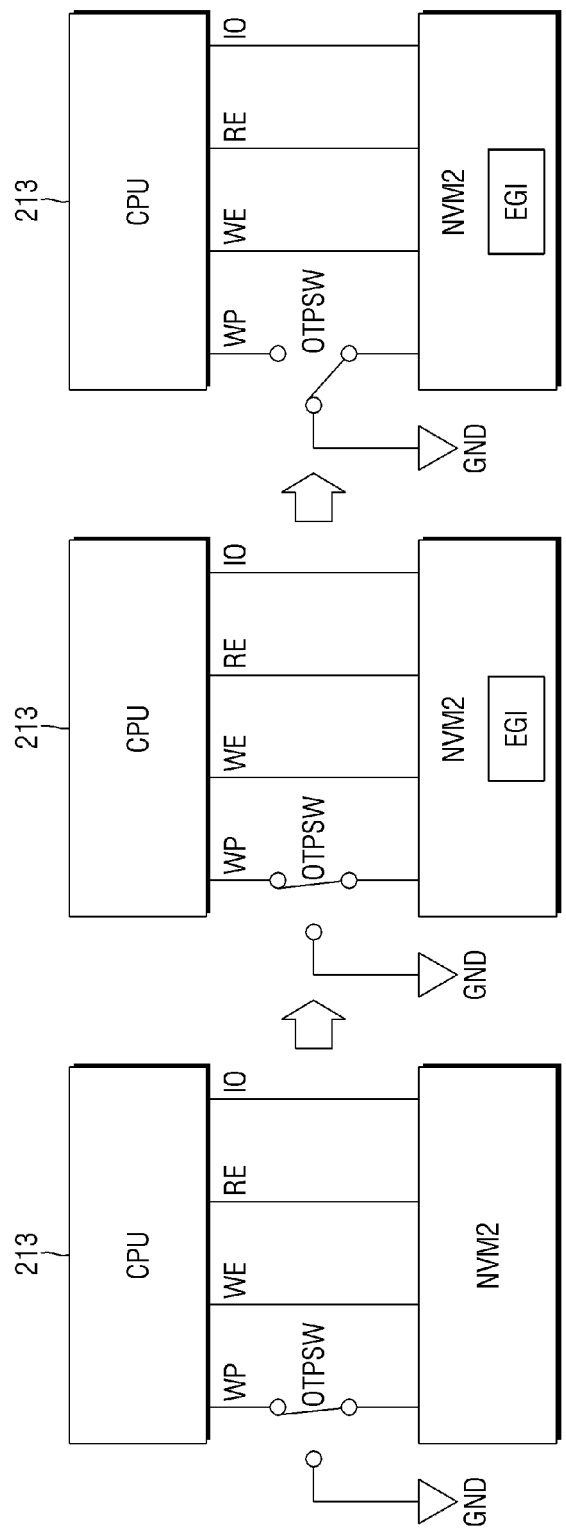
FIG. 7 is a diagram for describing the method of storing the emergency image of FIG. 6.
Figure 8:
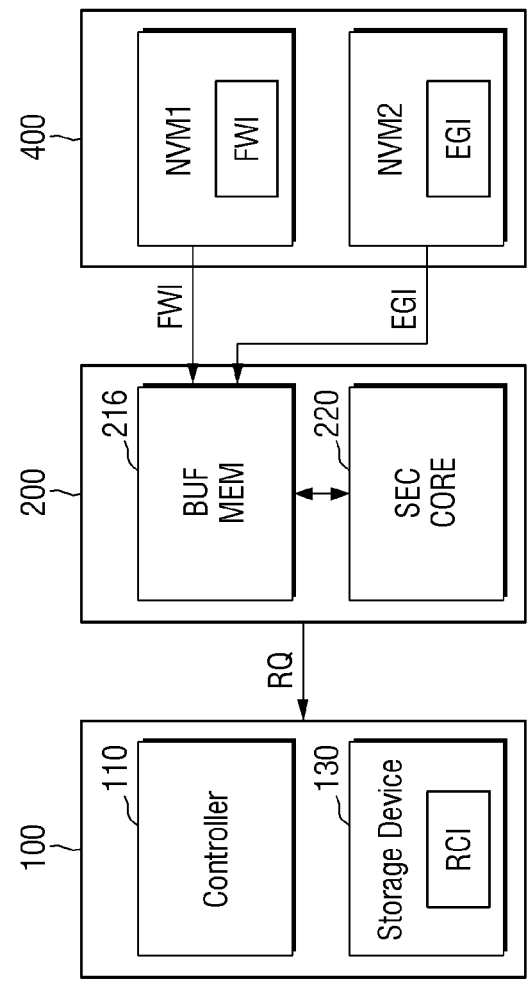
FIGS. 8 to 11 are diagrams for describing a method of recovering a firmware image of a memory system according to some exemplary embodiments.
Figure 9:
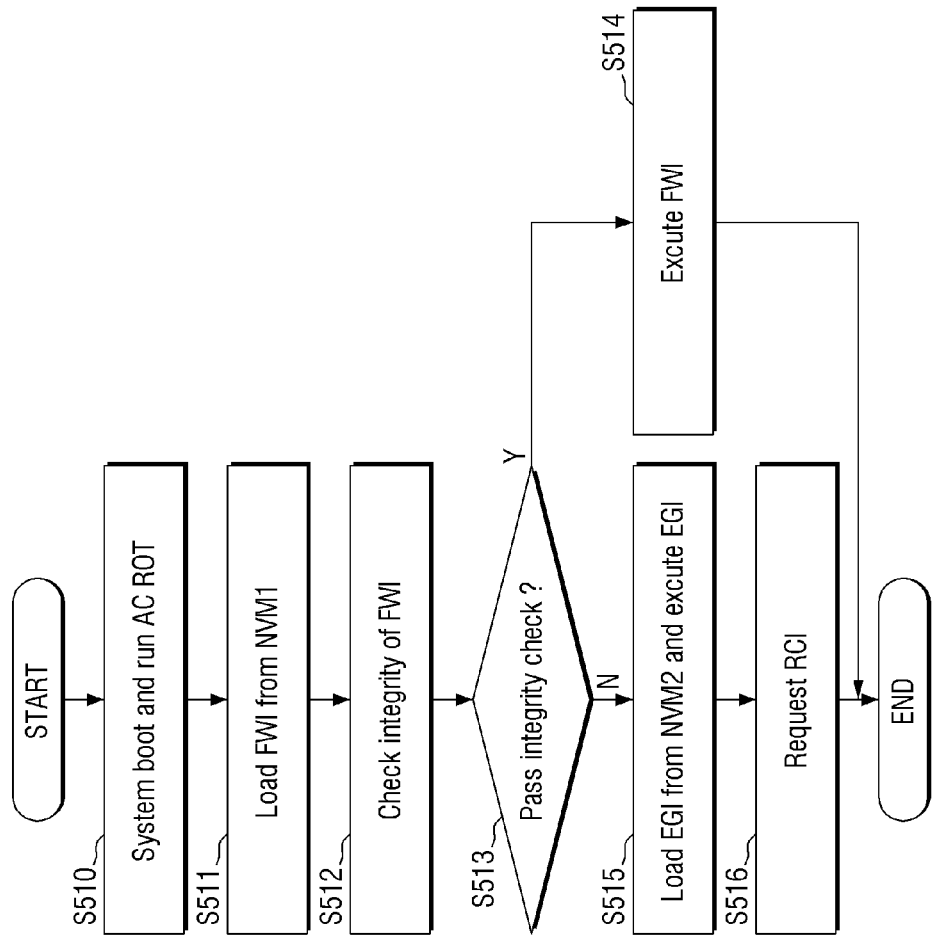
Figure 10:
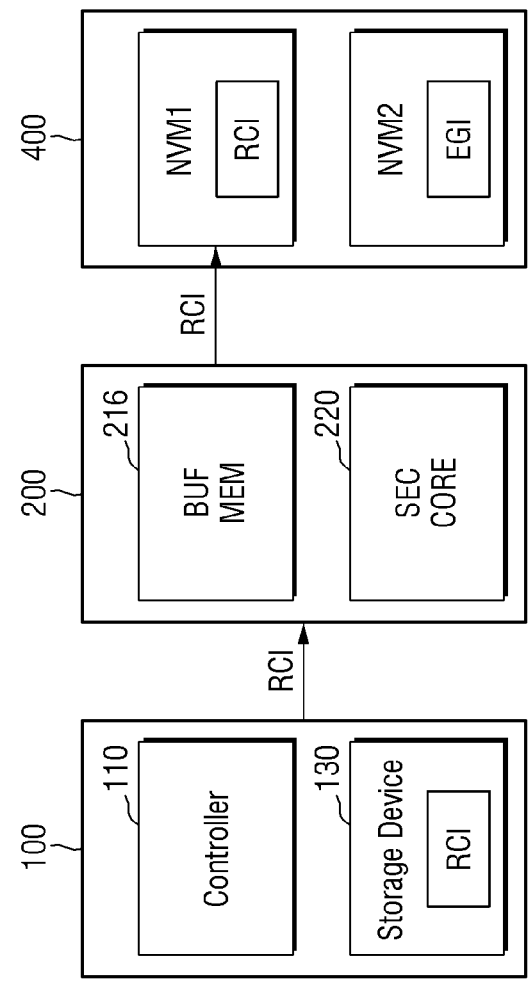
Figure 11:
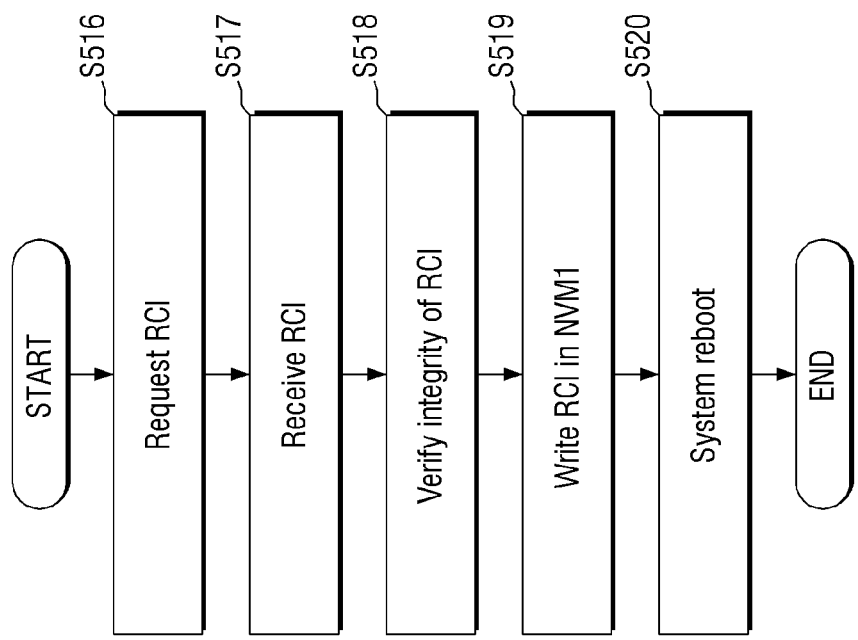

Referring to FIGS. 5 to 7, the storage controller 200 and the non-volatile memory 400 may be electrically connected to each other. For example, the CPU 213 of the storage controller 200 may be electrically connected to the second non-volatile memory NVM2. Before the product corresponding to the storage device 10 is shipped, the CPU 213 may provide a write protection signal WP, a write enable signal WE, a read enable signal RE, and input/output data IO to the second non-volatile memory NVM2. In the present exemplary embodiment, it is implied that the CPU 213 is directly connected to the second non-volatile memory NVM2, but the exemplary embodiments of the present disclosure are not limited thereto, and the corresponding components may also be indirectly connected to each other.

Here, an OTP switch OTPSW may be connected to a path providing the write protection signal WP. Here, the OTP switch OTPSW may be driven by a kill signal. Initially, the OTP switch OTPSW may have a closed state because the kill signal is not applied thereto. Accordingly, the second non-volatile memory NVM2 may receive the write protection signal WP from the CPU 213.

First, the CPU 213 may apply the write protection signal WP, the write enable signal WE, and the read enable signal RE (S500). That is, as the write protection signal WP, the write enable signal WE, and the read enable signal RE are applied to the second non-volatile memory NVM2, the emergency image EGI may be stored in the second non-volatile memory NVM2. That is, the second non-volatile memory NVM2 may store the emergency image EGI (S501).

Subsequently, the CPU 213 may apply a kill signal to the OTP switch OTPSW (S502). The OTP switch OTPSW may operate as the kill signal is applied thereto. Accordingly, the second non-volatile memory NVM2 may be connected to a ground voltage GND (S503). That is, the second non-volatile memory NVM2 may receive the write protection signal WP corresponding to the ground voltage. In this case, the OTP switch OTPSW does not operate again even if another signal is applied thereto. That is, the second non-volatile memory NVM2 may receive only the ground voltage GND through the write protection signal WP. Accordingly, the second non-volatile memory NVM2 may be in a write disabled state. That is, the second non-volatile memory NVM2 may have an immutable state. Accordingly, external access to the emergency image EGI stored in the second non-volatile memory NVM2 may be prohibited. Accordingly, a storage device having improved security may be provided.

However, the first non-volatile memory NVM1 may have a mutable state. That is, external access to the firmware image FWI stored in the first non-volatile memory NVM1 is possible. That is, the firmware image FWI may be newly written after deletion.

FIGS. 8 to 11 are diagrams for describing a method of recovering a firmware image of a memory system according to some exemplary embodiments.

Referring to FIGS. 8 to 11, the storage device 10 including the storage controller 200 and the non-volatile memory 400 may be connected to a host device 100. Here, the host device 100 may correspond to a device that manages the storage device 10. The host device 100 may boot and operate, and thus, the storage device 10 may be supplied with power and operate.

As power is applied, the storage device 10 may perform system booting and may run AC ROT (S510). For example, the security core 220 of the storage controller 200 may perform system booting of the storage device 10 and run AC ROT. The storage controller 200 may load the firmware image FWI from the first non-volatile memory NVM1 (S511). For example, the firmware image FWI may be buffered in the buffer memory 216. In this case, the storage device 10 may correspond to a state before performing a booting operation.

Subsequently, the storage controller 200 may check the integrity of the firmware image FWI (S512). For example, the security core 220 may check the integrity of the loaded firmware image FWI through digital signature verification. According to a modified state of the firmware image FWI, the integrity of the firmware image FWI may be checked.

When the firmware image FWI passes the integrity check (S513—Y), the storage controller 200 may execute the firmware image FWI (S514). As the storage controller 200 executes the firmware image FWI of which integrity is verified, the storage device 10 may be booted. In this case, the emergency image EGI stored in the second non-volatile memory NVM2 may not be used.

However, if the firmware image (FWI) does not pass the integrity check (S513—N), the storage controller 200 may load the emergency image EGI from the second non-volatile memory NVM2 and execute the emergency image EGI (S515). For example, the buffer memory 216 may buffer the emergency image EGI read from the second non-volatile memory NVM2. In addition, the security core 220 may operate the storage device 10 by executing the emergency image EGI. In this case, the function of the emergency image EGI executed by the security core 220 corresponds to a function of recovering the firmware image FWI. In addition, the function of the emergency image EGI executed by the security core 220 corresponds to a function of performing communication between the storage device 10 and the host device 100.

Accordingly, the storage controller 200 may request a recover image RCI from the host device 100 (S516). For example, the storage controller 200 executing the emergency image EGI may request the stored recover image RCI from the host device 100. The storage controller 200 may provide a recover image request signal RQ to the host device 100. The host device 100 receiving the RQ may provide the recover image RCI stored in the storage device 130 to the storage controller 200. In this case, the recover image RCI stored in the storage device 130 may be newly updated. That is, the storage device 130 corresponds to a mutable non-volatile memory.

The emergency image EGI driven by the storage controller 200 may receive the recover image RCI (S517). Subsequently, the emergency image EGI driven by the storage controller 200 may verify the integrity of the recover image RCI (S518). In this case, the storage controller 200 may perform an integrity check on the recover image RCI using the emergency image EGI. That is, the emergency image EGI driven by the storage controller 200 may check the integrity of the recover image RCI through digital signature verification.

The storage controller 200 may write the recover image RCI to the first non-volatile memory NVM1 (S519). Here, the recover image RCI may correspond to an image of which integrity is verified. The storage controller 200 in which the emergency image EGI is driven may provide the recover image RCI to the first non-volatile memory NVM1. The firmware image FWI previously stored in the first non-volatile memory NVM1 may be deleted, and the recover image RCI may be stored in the first non-volatile memory NVM1. Accordingly, the recover image RCI may be used as the firmware used when the storage device 10 is booted. Since the first non-volatile memory NVM1 is a mutable memory, a new recover image RCI may be stored, but since the second non-volatile memory NVM2 is an immutable memory, the emergency image EGI may be continuously stored.

After the recover image RCI is stored in the first non-volatile memory NVM1, a system reboot may be performed (S520). In this case, after the recover image RCI from the first non-volatile memory NVM1 is loaded into the buffer memory 216, the recover image RCI may be executed by the storage controller 200. In addition, the storage controller 200 may execute the loaded recover image RCI. That is, the recover image RCI may be executed as firmware. In this case, the security core 220 of the storage controller 200 may perform an integrity check on the recover image RCI, and boot the system using the recover image RCI when the RCI passes the integrity check.

Software stored in the storage device 10 may be modified by external hacking. For example, the firmware image FWI stored in the first non-volatile memory NVM1 corresponding to the mutable memory may be modified by hacking. However, the emergency image EGI stored in the second non-volatile memory NVM2 corresponding to the immutable memory cannot be modified by hacking. The storage device 10 having improved security performance may be provided through the function of receiving the recover image RCI from the exterior using the emergency image EGI and storing the recover image RCI in the first non-volatile memory NVM1.

Figure 12:
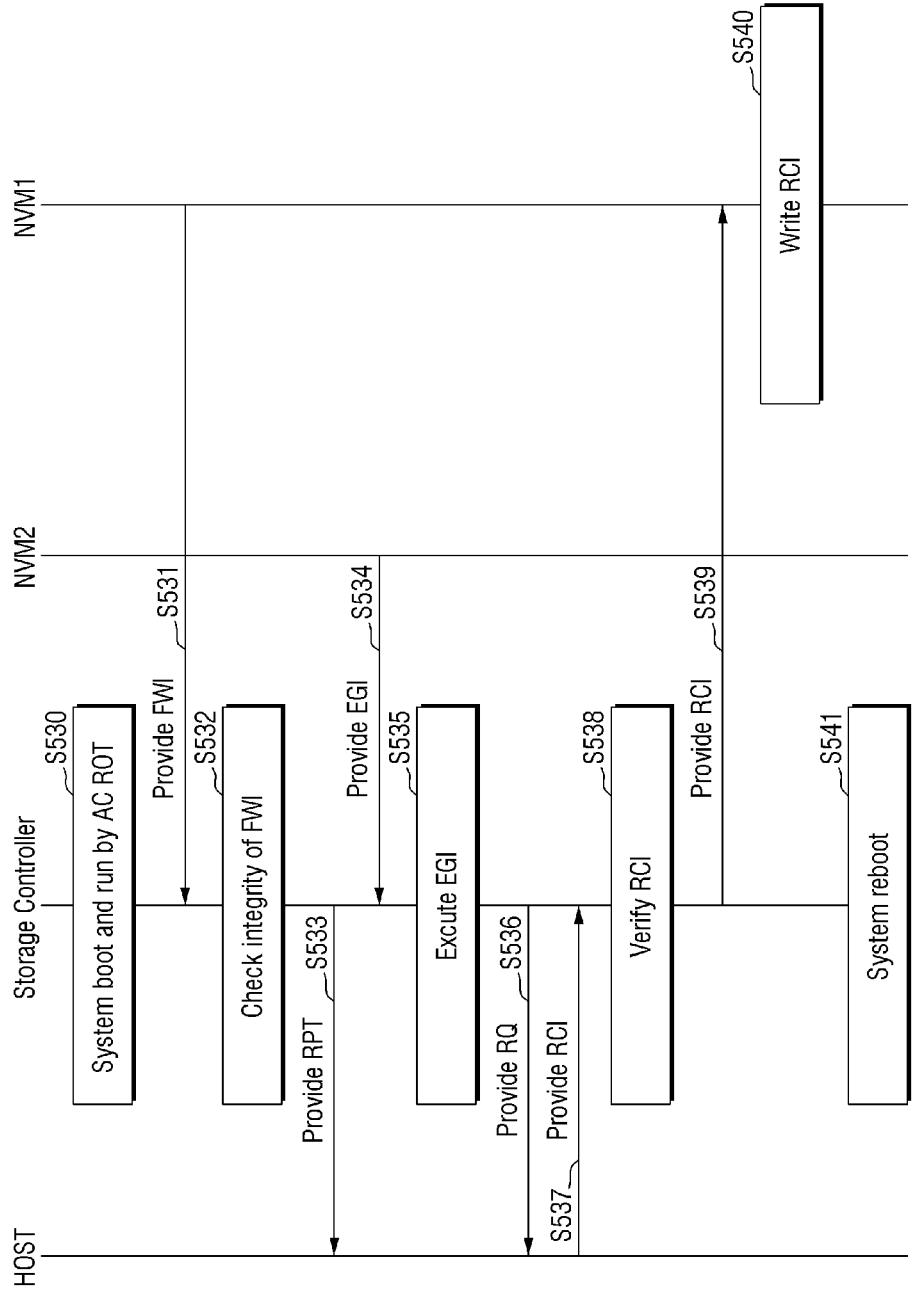
FIG. 12 is a ladder diagram for describing the method of recovering the firmware image of the memory system of FIGS. 8 to 11.

FIG. 12 is a ladder diagram for describing the method of recovering the firmware image of the memory system of FIGS. 8 to 11.

Referring to FIG. 12, after system booting, the storage controller 200 may be executed by the AC ROT (S530). Accordingly, the first non-volatile memory NVM1 may provide the firmware image FWI to the storage controller 200 (S531). The security core 220 of the storage controller 200 may check the integrity of the firmware image FWI (S532). The security core 220 of the storage controller 200 may provide a report signal RPT including the integrity check for the firmware image FWI to the host device 100 (S533).

Subsequently, when the integrity check of the firmware image FWI is not passed, the second non-volatile memory NVM2 may provide the emergency image EGI to the storage controller 200 (S534). The storage controller 200 may execute the emergency image EGI (S535). Accordingly, the storage controller 200 may provide the recover image request signal RQ to the host device 100 (S536), and the host device 100 may provide the recover image RCI to the storage controller 200 in response to the RQ (S537).

The storage controller 200 may verify the recover image (RCI) (S538), and when the verification of the recover image RCI is passed, the storage controller 200 may provide the recover image RCI to the first non-volatile memory NVM1 (S539). Subsequently, the first non-volatile memory NVM1 may write the recover image RCI (S540).

After all processes are completed, a system reboot may be performed (S541). Accordingly, the recover image RCI may be loaded from the first non-volatile memory NVM1.

Hereinafter, the storage device 10 according to another exemplary embodiment will be described with reference to FIGS. 13 and 14.

Figure 13:
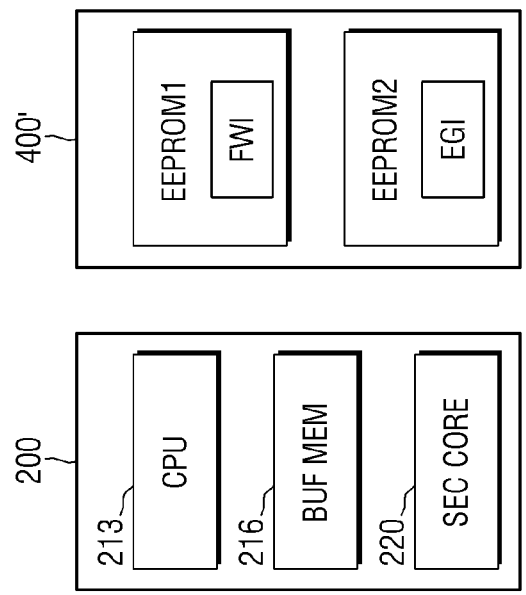
FIGS. 13 and 14 are diagrams of a method of storing an emergency image in a non-volatile memory including an EEPROM.
Figure 14:
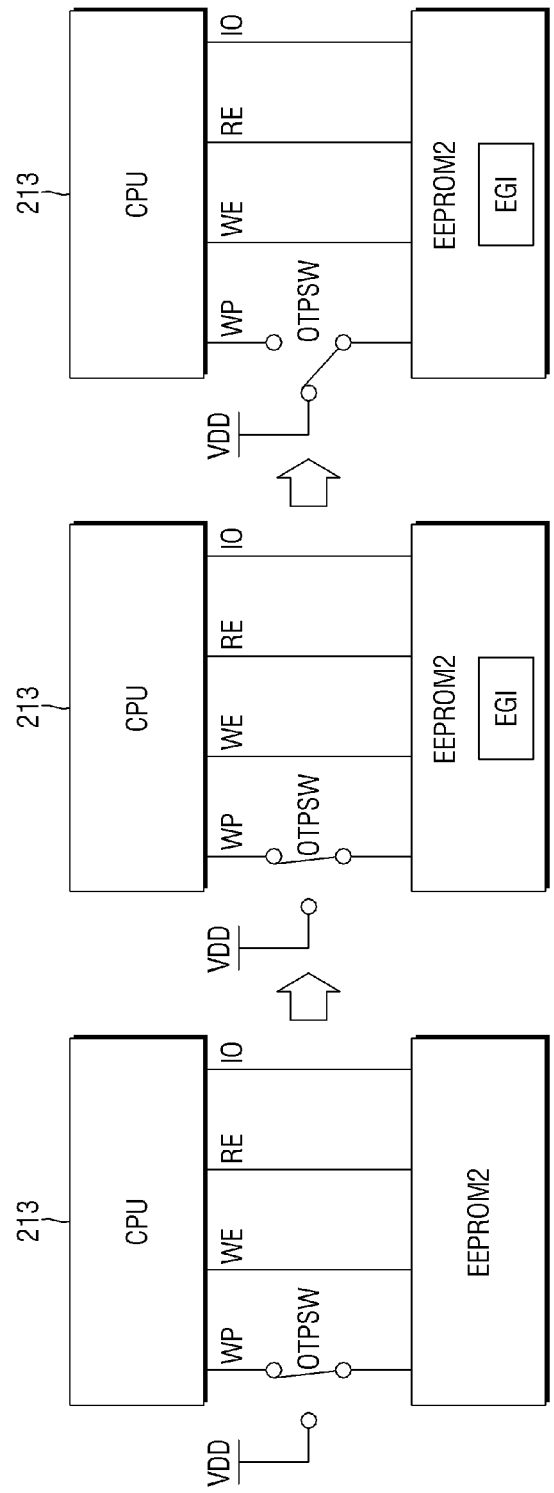

FIGS. 13 and 14 are diagrams of a method of storing an emergency image in a non-volatile memory including an EEPROM. For convenience of explanation, portions overlapping those described above with reference to FIGS. 1 to 12 will be either briefly described or a description thereof will be omitted as redundant.

Referring to FIGS. 13 and 14, a non-volatile memory 400' may include a first EEPROM EEPROM1 and a second EEPROM EEPROM2. That is, the storage device 10 including the non-volatile memory 400' may correspond to an EEPROM rather than an SSD. In this case, the first EEPROM EEPROM1 may store a firmware image FWI, and the second EEPROM EEPROM2 may store an emergency image EGI. As described above, the first EEPROM EEPROM1 may correspond to the mutable memory, but the second EEPROM EEPROM2 may correspond to the immutable memory.

Before the emergency image EGI is stored in the second EEPROM EEPROM2, the OTP switch OTPSW may be closed. That is, the write protection signal WP may be applied to the second EEPROM EEPROM2. However, after the emergency image EGI is stored in the second EEPROM EEPROM2, the OTP switch OTPSW may be supplied with a kill signal and may operate, and the second EEPROM EEPROM2 may be supplied with a source voltage VDD. That is, the second EEPROM EEPROM2 may be supplied with the source voltage VDD through the write protection signal WP. Accordingly, the second EEPROM EEPROM2 may become an immutable memory. However, the exemplary embodiment of the present disclosure is not limited thereto.

Figure 15:
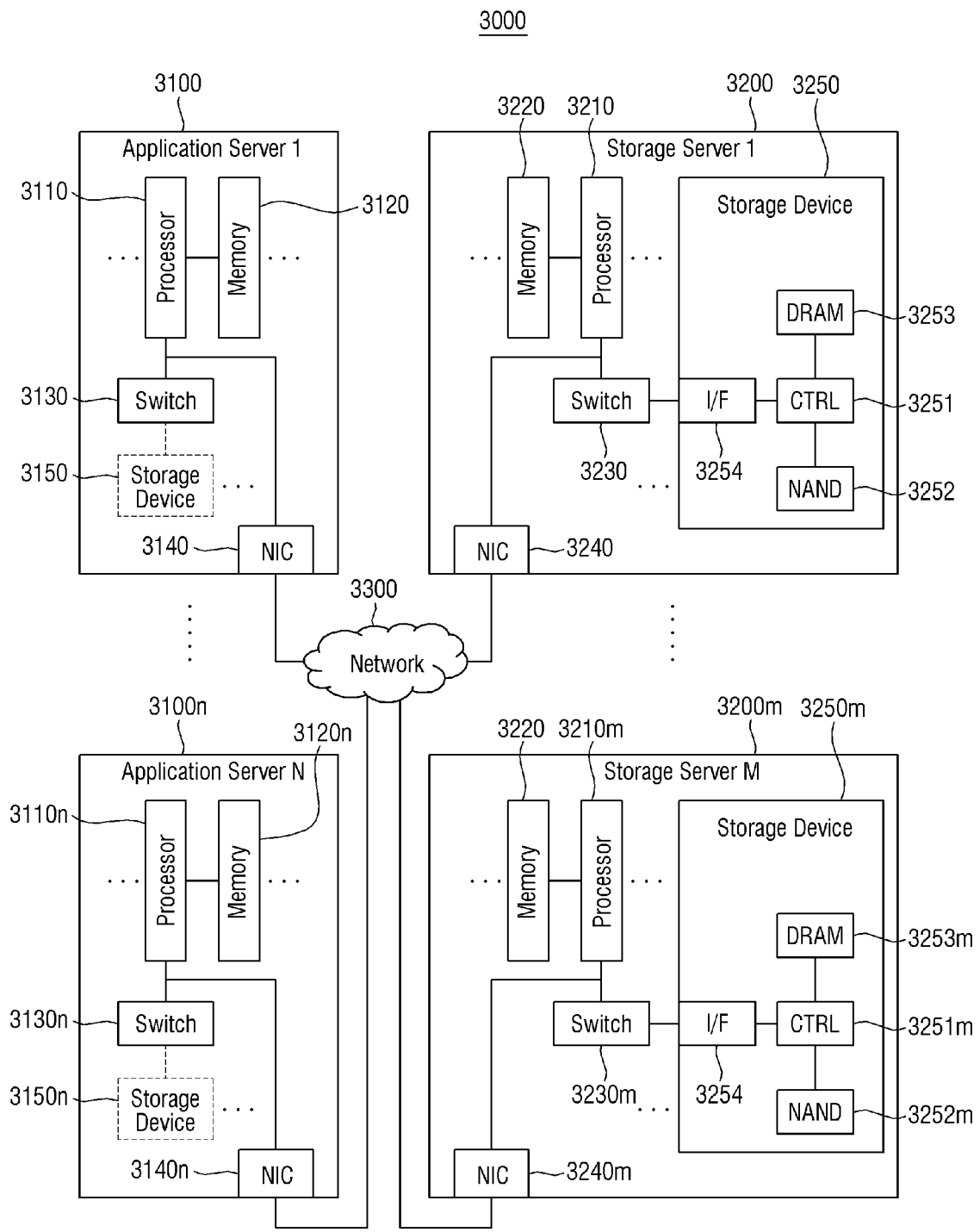
FIG. 15 is a diagram of a data center including storage devices according to some exemplary embodiments.

FIG. 15 is a diagram of a data center including storage devices according to some exemplary embodiments.

Referring to FIG. 15, a data center 3000 is a facility that collects various types of data and provides services, and may also be referred to as a data storage center. The data center 3000 may be a system for operating a search engine and a database, and may be a computing system used in a business such as a bank or a government institution. The data center 3000 may include application servers 3100 to 3100n and storage servers 3200 to 3200m. The number of application servers 3100 to 3100n and the number of storage servers 3200 to 3200m may be variously selected according to the exemplary embodiment, and may be different from each other.

The application server 3100 or the storage server 3200 may include at least one of processors 3110 and 3210 and memories 3120 and 3220. If the storage server 3200 is described as an example, the processor 3210 may control an overall operation of the storage server 3200, and may access the memory 3220 to execute instructions and/or data loaded into the memory 3220. Memory 3220 may be a double data rate synchronous DRAM (DDR SDRAM), a high bandwidth memory (HBM), a hybrid memory cube (HMC), a dual in-line memory module (DIMM), an optane DIMM, and/or a non-volatile DIMM (NVMDIMM). According to an exemplary embodiment, the number of processors 3210 and the number of memories 3220 included in the storage server 3200 may be variously selected. In one exemplary embodiment, the processor 3210 and the memory 3220 may provide a processor-memory pair. In one exemplary embodiment, the number of processors 3210 and the number of memories 3220 may be different from each other. The processor 3210 may include a single-core processor or a multi-core processor. The description of the storage server 3200 may be similarly applied to the application server 3100. According to exemplary embodiments, the application server 3100 may not include the storage device 3150. The storage server 3200 may include one or more storage devices 3250. The number of storage devices 3250 included in the storage server 3200 may be variously selected according to exemplary embodiments. The storage device 3250 may include the storage device 10 described with reference to FIGS. 1 to 14. That is, the storage device 3250 may include the first non-volatile memory NVM1 that stores the firmware image FWI and is mutable and the second non-volatile memory NVM2 that stores the emergency image EGI and is immutable.

The application servers 3100 to 3100n and the storage servers 3200 to 3200m may communicate with each other through a network 3300. The network 3300 may be implemented using a fiber channel (FC) or Ethernet. In this case, the FC is a medium used for relatively high-speed data transmission, and an optical switch providing high performance/high availability may be used. Depending on the access method of the network 3300, the storage servers 3200 to 3200m may be provided as file storage, block storage, or object storage.

In one exemplary embodiment, the network 3300 may be a storage-only network, such as a storage area network (SAN). For example, the SAN may be an FC-SAN that uses an FC network and is implemented according to an FC protocol (FCP). As another example, the SAN may be an IP-SAN that uses a TCP/IP network and is implemented according to an SCSI over TCP/IP or Internet SCSI (iSCSI) protocol. In another exemplary embodiment, the network 3300 may be a generic network, such as a TCP/IP network. For example, the network 3300 may be implemented according to protocols such as FC over Ethernet (FCoE), Network Attached Storage (NAS), and NVMe over Fabrics (NVMe-oF).

Here, the application servers 3100 to 3100n may correspond to the host device 100 described with reference to FIGS. 1 to 14. That is, the application servers 3100 to 3100n may store the recover image RCI, and may provide the recover image RCI according to the recover image request signal RQ from the storage servers 3200 to 3200m. Accordingly, the recover image RCI of the latest updated version may be provided as firmware.

Hereinafter, the application server 3100 and the storage server 3200 will be mainly described. The description of the application server 3100 may also be applied to another application server 3100n, and the description of the storage server 3200 may also be applied to another storage server 3200m.

The application server 3100 may store data requested to be stored by a user or a client in one of the storage servers 3200 to 3200m through the network 3300. In addition, the application server 3100 may acquire data requested to be read by a user or a client from one of the storage servers 3200 to 3200m through the network 3300. For example, the application server 3100 may be implemented as a web server or a database management system (DBMS).

The application server 3100 may access a memory 3120n or a storage device 3150n included in another application server 3100n through the network 3300, or may access memories 3220 to 3220m or storage devices 3250 to 3250m included in the storage servers 3200 to 3200m through the network 3300. Accordingly, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. In such a case, the data may be moved to the memories 3120 to 3120n of the application servers 3100 to 3100n through the memories 3220 to 3220m of the storage servers 3200 to 3200m from the storage devices 3250 to 3250m of the storage servers 3200 to 3200m, or may be directly moved thereto. The data moving through the network 3300 may be encrypted data for security or privacy.

If the storage server 3200 is described as an example, an interface 3254 may provide a physical connection between the processor 3210 and the controller 3251 and a physical connection between the network interconnect (NIC) 3240 and the controller 3251. For example, the interface 3254 may be implemented in a direct attached storage (DAS) manner for directly connecting the storage device 3250 with a dedicated cable. In addition, for example, the interface 3254 may be implemented in various interface manners such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an institute of electrical and electronic engineers (IEEE) 1394, a universal serial bus (USB), a secure digital (SD) card, a multi-media card (MMC), an embedded multi-media card (eMMC), a universal flash storage (UFS), an embedded UFS (eUFS), and/or a compact flash (CF) card interface.

The storage server 3200 may further include a switch 3230 and a NIC 3240. The switch 3230 may selectively connect the processor 3210 and the storage device 3250 or selectively connect the NIC 3240 and the storage device 3250 under the control of the processor 3210.

In one exemplary embodiment, the NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a digital signal processor (DSP), a host bus interface, and the like, and may be connected to the processor 3210 and/or the switch 3230 through a host bus interface. The host bus interface may be implemented as one of the examples of interface 3254 described above. In one exemplary embodiment, the NIC 3240 may be integrated with at least one of the processor 3210, the switch 3230, and the storage device 3250.

In the storage servers 3200 to 3200m or the application servers 3100 to 3100n, the processor may program or read data by transmitting a command to the storage devices 3150 to 3150n and 3250 to 3250m or the memories 3120 to 3120n and 3220 to 3220m. In this case, the data may be error-corrected data through an error correction code (ECC) engine. The data is data processed by data bus inversion (DBI) or data masking (DM), and may include cyclic redundancy code (CRC) information. The data may be encrypted data for security or privacy.

The storage devices 3150 to 3150n and 3250 to 3250m may transmit a control signal and a command/address signal to NAND flash memory devices 3252 to 3252m in response to a read command received from the processor. Accordingly, when data is read from the NAND flash memory devices 3252 to 3252m, a read enable (RE) signal may be input as a data output control signal and serve to output the data to a DQ bus. A data strobe (DQS) may be generated using the RE signal. The command and address signals may be latched in a page buffer according to a rising edge or a falling edge of a write enable (WE) signal.

The controller 3251 may control an overall operation of the storage device 3250. In one exemplary embodiment, the controller 3251 may include a static random access memory (SRAM). The controller 3251 may write data to the NAND flash 3252 in response to a write command, or may read data from the NAND flash 3252 in response to a read command. For example, the write command and/or the read command may be provided from a processor 3210 in the storage server 3200, a processor 3210m in another storage server 3200m, or processors 3110 and 3110n in the application servers 3100 and 3100n. A DRAM 3253 may temporarily store (buffer) data to be written to the NAND flash 3252 or data read from the NAND flash 3252. In addition, the DRAM 3253 may store metadata. Here, the metadata is user data or data generated by the controller 3251 to manage the NAND flash 3252. The storage device 3250 may include a secure element (SE) for security or privacy.

Figure 16:
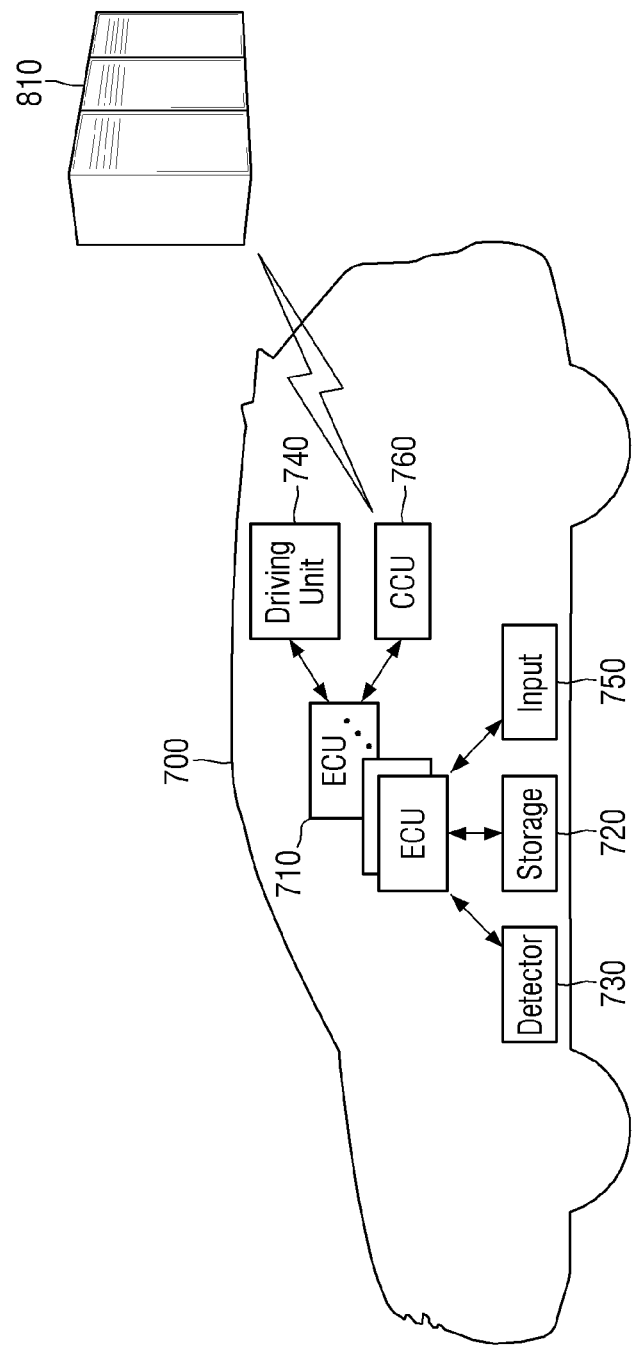
FIG. 16 is a diagram of a vehicle including a storage device according to some exemplary embodiments.

FIG. 16 is a diagram of a vehicle including a storage device according to some exemplary embodiments.

Referring to FIG. 16, a vehicle 700 may include a plurality of electronic control units (ECUs) 710 and a storage device 720. In this case, the electronic control unit 710 may correspond to the host device 100 described above, and the storage device 720 may correspond to the storage device 10 described above.

Each of the plurality of electronic control units 710 may be electrically, mechanically, and communicatively connected to at least one of a plurality of devices provided in the vehicle 700, and may control an operation of at least one device based on any one function execution command.

Here, the plurality of devices may include an acquisition device 730 that acquires information required to perform at least one function, and a driving unit 740 that performs at least one function.

For example, the acquisition device 730 may include various detectors and image acquirers, and the driving unit 740 may include a fan and compressor of an air conditioning device, a fan of a ventilation device, an engine and motor of a power device, a motor of a steering device, a motor and valve of a braking device, and an opening/closing device of a door or a tailgate.

The plurality of electronic control units 710 may communicate with the acquisition device 730 and the driving unit 740 using, for example, at least one of Ethernet, low voltage differential signal (LVDS) communication, and local interconnect network (LIN) communication.

The plurality of electronic control units 710 may determine whether or not to perform a function based on information acquired through the acquisition device 730, and control an operation of the driving unit 740 that performs the corresponding function when it is determined that the function needs to be performed and control an operational degree based on the acquired information. In this case, the plurality of electronic control units 710 may store the acquired information in the storage device 720 or read and use the information stored in the storage device 720.

The plurality of electronic control units 710 may also control the operation of the driving unit 740 that performs the corresponding function based on the function execution command input through an input unit 750, and also check a setting amount corresponding to the information input through the input unit 750 and control the operation of the driving unit 740 that performs the corresponding function based on the checked setting amount.

Each electronic control unit 710 may independently control any one function or may control any one function in connection with other electronic control units.

For example, when a distance to an obstacle detected through a distance detector is within a reference distance, an electronic control unit of a collision avoidance device may output a warning sound about an impending collision with the obstacle through a speaker.

An electronic control unit of an autonomous driving control device may perform autonomous driving by receiving navigation information, road image information, and distance information from obstacles and controlling a power device, a braking device, and a steering device using the received information, in connection with an electronic control unit of a vehicle terminal, an electronic control unit of an image acquirer, and an electronic control unit of a collision avoidance device.

A connectivity control unit (CCU) 760 is electrically, mechanically, and communicatively connected to the plurality of electronic control units 710, respectively, and performs communication with the plurality of electronic control units 710, respectively.

That is, the connectivity control unit 760 may also perform direct communication with the plurality of electronic control units 710 provided inside the vehicle, may also communicate with an external server, and may also communicate with an external terminal through an interface.

Here, the connectivity control unit 760 may communicate with the plurality of electronic control units 710 and may communicate with a server 810 using an antenna (not illustrated) and RF communication.

In addition, the connectivity control unit 760 may communicate with the server 810 through wireless communication. In this case, the wireless communication between the connectivity control unit 760 and the server 810 may be performed through various wireless communication technologies such as Global System for Mobile Communication (GSM), Code Division Multiple Access (CDMA), Wideband Code Division Multiple Access (WCDMA), universal mobile telecommunications system (UMTS), Time Division Multiple Access (TDMA), and Long Term Evolution (LTE), in addition to the Wifi module and the Wireless broadband module.

Exemplary embodiments of the present disclosure have been described hereinabove with reference to the accompanying drawings, but the present disclosure is not limited to the above-described exemplary embodiments, and may be implemented in various different forms, and one of skill in the art to which the present disclosure pertains may understand that the present disclosure may be implemented in other specific forms without changing the technical spirit or essential features of the present disclosure. Therefore, it is to be understood that the exemplary embodiments described above are illustrative rather than being restrictive in all aspects.

What is claimed is:

1. A storage device comprising:
a first non-volatile memory storing a firmware image, wherein the first non-volatile memory is configured to be in a write enable state;
a second non-volatile memory storing an emergency image, wherein the second non-volatile memory is configured to be in an immutable, write disabled state based on a kill signal applied to a one-time-programmable (OTP) switch of the second non-volatile memory; and
a storage control circuit configured to control the first and second non-volatile memories,
wherein the storage control circuit is configured to
apply a write protection signal to the second non-volatile memory at a first time,
apply the kill signal to the OTP switch at a second time subsequent to the first time,
check an integrity of the firmware image received from the first non-volatile memory,
load and execute the emergency image from the second non-volatile memory when the integrity check of the firmware image fails,
receive a recover image from an external device based on the emergency image, and
provide the recover image to the first non-volatile memory.

2. The storage device of claim 1, wherein the second non-volatile memory is supplied with a ground voltage through the write protection signal.

3. The storage device of claim 1, wherein the second non-volatile memory is supplied with a source voltage through the write protection signal.

4. The storage device of claim 1, wherein the storage control circuit is configured to provide a result of the integrity check of the firmware image to the external device.

5. The storage device of claim 1, wherein the storage control circuit is configured to provide a recover image request signal to the external device based on the emergency image, and to receive the recover image in response to the provision of the recover image request signal.

6. The storage device of claim 1, wherein the storage control circuit is configured to execute the firmware image when the integrity check of the firmware image is successful.

7. The storage device of claim 1, wherein the first non-volatile memory is configured to delete the firmware image and store the recover image, and the storage control circuit is configured to perform a rebooting after the recover image is stored.

8. The storage device of claim 7, wherein the storage control circuit is configured to execute the recover image received from the first non-volatile memory as firmware.

9. The storage device of claim 1, wherein the first non-volatile memory, the second non-volatile memory, or both the first non-volatile memory and the second non-volatile memory include a flash memory or an EEPROM.

10. A memory system comprising:
a non-volatile memory storing a firmware image in a first portion of the non-volatile memory and an emergency image in a second portion of the non-volatile memory;

a storage control circuit configured to control the non-volatile memory; and a host device connected to the storage control circuit and configured to store a recover image, wherein the second portion of the non-volatile memory in which the emergency image is stored is configured to be in an immutable, write disabled state based on a kill signal applied to a one-time-programmable (OTP) switch, and the first portion of the non-volatile memory in which the firmware image is stored is configured to be in a write enabled state, the storage control circuit is configured to
apply a write protection signal to the second portion of the non-volatile memory at a first time,
apply the kill signal to the OTP switch at a second time subsequent to the first time,
load and execute the emergency image from the non-volatile memory, and
provide a recover image request signal to the host device based on the emergency image, the host device is configured to provide the recover image to the storage control circuit in response to the recover image request signal, and the storage control circuit is configured to replace the firmware image of the non-volatile memory with the recover image.

11. The memory system of claim 10, wherein the host device is configured to access the first portion of the non-volatile memory in which the firmware image is stored, and not the second portion of the non-volatile memory in which the emergency image is stored.

12. The memory system of claim 11, wherein the second portion of the non-volatile memory in which the emergency image is stored is applied with a ground voltage through the write protection signal.

13. The memory system of claim 11, wherein the second portion of the non-volatile memory in which the emergency image is stored is applied with a source voltage through the write protection signal.

14. The memory system of claim 10, wherein the host device is configured to update the recover image.

15. The memory system of claim 10, wherein the storage control circuit is configured to perform a rebooting after being replaced with the recover image, and to execute the recover image received from the non-volatile memory as firmware.

16. The memory system of claim 10, wherein the non-volatile memory includes at least one of a flash memory and an EEPROM.

17. The memory system of claim 16, wherein an interface between the storage control circuit and the host device includes at least one of I2C, PCIe, UART, and USB.

18. An operating method for a storage device, the operating method comprising:
providing a storage device including a storage control circuit, a first non-volatile memory storing a firmware image, and a second non-volatile memory storing an emergency image, wherein the first non-volatile memory is configured to be in a write enable state, and wherein the second non-volatile memory is configured to be in an immutable, write disabled state based on a kill signal applied to a one-time-programmable (OTP) switch of the second non-volatile memory;
booting the storage control circuit to load the firmware image from the first non-volatile memory;
applying a write protection signal to the second non-volatile memory at a first time;
applying the kill signal to the OTP switch at a second time subsequent to the first time;
performing an integrity check on the firmware image;
loading and executing the emergency image from the second non-volatile memory when the integrity check of the firmware image fails;
providing a recover image request signal to an external device based on the emergency image;
receiving a recover image from the external device;
writing the recover image to the first non-volatile memory; and
rebooting the storage control circuit to load the recover image from the first non-volatile memory.

19. The operating method of claim 18, wherein the first non-volatile memory has a write enable state, and the second non-volatile memory has a write disable state.

* * * * *